United States Patent
Maier et al.

(10) Patent No.: US 7,805,280 B2
(45) Date of Patent: Sep. 28, 2010

(54) METHOD AND DEVICE FOR ANALYZING A TECHNICAL PROCESS

(75) Inventors: Rupert Maier, Eggolsheim (DE); Ralf Sykosch, Weilersbach (DE)

(73) Assignee: Siemens Aktiengesellschaft, Munich (DE)

( * ) Notice: Subject to any disclaimer, the term of this patent is extended or adjusted under 35 U.S.C. 154(b) by 787 days.

(21) Appl. No.: 11/665,505

(22) PCT Filed: Oct. 7, 2005

(86) PCT No.: PCT/EP2005/055110
§ 371 (c)(1),
(2), (4) Date: Apr. 13, 2007

(87) PCT Pub. No.: WO2006/042799
PCT Pub. Date: Apr. 27, 2006

(65) Prior Publication Data
US 2008/0154545 A1  Jun. 26, 2008

(30) Foreign Application Priority Data
Oct. 15, 2004 (DE) .......... 10 2004 050 386

(51) Int. Cl.
*G06F 17/40* (2006.01)

(52) U.S. Cl. .......... 702/187; 702/182; 702/188; 702/189; 700/109; 700/110; 700/122; 700/123; 700/124; 700/125; 700/126; 700/127; 700/128; 700/129; 340/506; 340/531; 340/825.36; 715/736; 714/47

(58) Field of Classification Search ............. 702/182, 702/187–189; 700/109, 110, 122–129; 340/506, 340/531, 825.36; 715/736; 714/47
See application file for complete search history.

(56) References Cited

U.S. PATENT DOCUMENTS

2002/0131540 A1 * 9/2002 Franke et al. .......... 375/356
2005/0197805 A1 * 9/2005 Eryurek et al. .......... 702/188

FOREIGN PATENT DOCUMENTS

| DE | 100 62 353 A1 | 7/2002 |
| DE | 102 41 429 A1 | 3/2004 |
| DE | 10236843 A1 | 3/2004 |
| DE | 10 2004 012 506 A1 | 10/2005 |
| EP | 0 903 655 A2 | 3/1999 |
| EP | 1 256 858 A2 | 11/2002 |
| EP | 1 312 990 A2 | 5/2003 |
| JP | 2001125612 A | 5/2001 |

* cited by examiner

Primary Examiner—Sujoy K Kundu

(57) ABSTRACT

A method for analyzing technical processes is disclosed, which is characterized in that measuring data of the technical process is generated by at least one decentralized measuring unit, image data associated with a mechanical course of the technical process is produced by at least one decentralized image detection unit, the measuring data stored in the at least one decentralized measuring unit and the image data stored in the at least one image detection unit is provided with a time stamp available to all systems, the measuring and image data are transmitted to a central detection unit where said data is displayed and/or processed in a time-synchronous manner using the time stamp function. Since time stamping is carried out directly in situ, i.e. decentrally in the respective measuring and image detection units, data transmission time required to transmit data to the central detection unit is not critical, so that a time-synchronized display and/or further processing of the measuring and image data can be carried out in the central detection unit with a high degree of accuracy.

20 Claims, 4 Drawing Sheets

METHOD AND DEVICE FOR ANALYZING A TECHNICAL PROCESS

CROSS REFERENCE TO RELATED APPLICATIONS

This application is the US National Stage of International Application No. PCT/EP2005/055110, filed Oct. 7, 2005 and claims the benefit thereof. The International Application claims the benefits of German application No. 10 2004 050 386.9 filed Oct. 15, 2004, both of the applications are incorporated by reference herein in their entirety.

FIELD OF INVENTION

The invention relates to a method and to a device for analyzing a technical process.

BACKGROUND OF THE INVENTION

For analyzing technical processes, such as industrial manufacturing processes, it is already known to detect measuring data from the process as well as images of the process and to display these on-line or off-line.

In the case of EP 1 312 990 A2, for disruption analysis or monitoring of a technical plant, measuring data from the plant and image data relating to a mechanical movement sequence of the plant are transmitted to a controller and provided with a time stamp therein. This time stamp establishes the exact detection time of the data and allows the image data and the measuring data for analysis of the technical plant to be displayed and/or processed further in a time-synchronous manner.

The abstract of the published Japanese patent application JP 2001 125612 A also discloses the detection of image data from a production unit and of data of a PLC (Programmable Logic Controller) in a central detection unit and the provision of said data at this location with a time stamp to allow subsequent time-synchronous analysis of said data.

In a technical plant with decentralized units that are widely spaced apart the sequence over time of the measuring and image data detected by the individual decentralized units is important for the analysis of the technical process. Highly accurate analysis of the sequence over time of the data generated by the measuring and image detection units is necessary in particular in the case of a disruption to determine the trigger cause.

This applies in particular to high-speed technical processes, such as manufacturing processes for continuous material, such as paper and plastic films, for which measuring data and image data detection in the millisecond range, even better in the microsecond range, is necessary owing to the high speed of the material (for example 180 km/h in the case of a paper web in a paper machine).

However, with measuring and image detection units that are located a long way (for example several hundred meters or more) from the central detection unit there exists the problem that, for example owing to the different running times of the data from the decentralized measuring and image detection units to the central detection unit, time stamping exhibits a certain indistinctness, so sometimes a clear statement on the sequence over time of the data issued by the measuring and image detection units is not possible. This leads to indistinctness in the time-synchronous allocation of the image data to the measuring data. The different running times can be caused by the length of the transmission paths but also by devices connected into the transmission paths.

SUMMARY OF INVENTION

The object underlying the invention is therefore to specify a method and a device for analyzing a technical process which, even in the case of a large distance between a central detection unit and the measuring and image detection units, allows highly accurate time synchronization of the image and measuring data.

The solution to the object directed at the method is achieved according to the invention by a method according to the claims. The solution to the object directed at the device is achieved according to the invention by a device according to the claims. Advantageous embodiments of the method or device are the subject matter of the subclaims respectively.

The invention turns away from the previous approach of performing time stamping of the measuring and image data in the central detection unit. Instead time stamping accordingly takes place directly in situ, i.e. decentrally, in the measuring and image detection units. Since the measuring and image data is already provided with the time stamp in the decentralized units, the data transmission time to the central detection unit is not critical. Since, moreover, the time stamp is available to all measuring and image data detection units this also ensures that events that occur at the same time for example are provided with the same time stamp, i.e. with the same time indications, by both the measuring units and image detection units. Highly accurate time synchronization of the measuring and image data is therefore possible in the central detection unit with the aid of the time stamp, so images and measured values in the range of microseconds or less can be displayed or processed further in a time-synchronous manner.

A time stamp available to all units can be generated in that a common timer for supplying a time indication for the time stamp is associated with the at least one decentralized measuring unit and the at least one decentralized image detection unit. In this connection, the timer can be connected to the at least one decentralized measuring unit and also to the at least one decentralized image detection unit wirelessly or in a wired manner. The common timer can, for example, be the GPS system or a radio clock system.

According to a particularly advantageous embodiment of the invention the common timer is a bus system via which the at least one measuring unit and the at least one image detection unit are connected to each other. This bus system can, for example, be a measuring bus system to which the central detection unit is also connected and via which the measuring data and the image data are transmitted to the central detection unit.

The bus clock of the bus system is preferably used in this connection as a time indication for the time stamp. The bus clock immediately and directly indicates the time with which the measuring data and image data are provided. Use is therefore made of a standardized time element integrated in the bus system, so time stamping can take place without particular additional expenditure. For example the bus clock periodically counts up from zero to a predefined end time. Time stamping via the bus clock then involves relative time stamping since the time indications provided by the bus clock are repeated after a bus clock period has been passed through. For analysis of most measuring tasks it is sufficient to obtain an accurate statement about the relative time of a measured value relative to an image that has been taken.

If desired, absolute times may also be allocated to the data provided at the measuring and image detection units with a relative time indication via the bus clock. For this purpose the relative time indications of the time stamp, predefined by the bus clock, can be converted in the central detection unit into an absolute time indication. More precise details about the conversion process can be found in the as yet unpublished German patent application belonging to the applicant with official application file reference 10 2004 012 506.6.

Alternatively a time stamp available to all units can be produced in that a separate timer for supplying a time indication for the time stamp is associated with the at least one decentralized measuring unit and the at least one decentralized image detection unit in each case, the respective timers being synchronized with each other. A timer "associated" with a measuring unit or an image detection unit is in this connection taken to mean a timer which is either integrated in the measuring unit or image detection unit or is a separate device which is connected to the measuring unit or image detection unit wirelessly or in a wired manner for transmission of a time indication.

Temporal synchronization preferably takes place by way of a reference timer. The time thereof can be used as a reference time for the timers of the at least one measuring unit or the at least one image detection unit. The reference timer can, for example, be the GPS system.

A particularly high level of accuracy in synchronization of the timers is possible in that one of the timers of the at least one measuring unit or the at least one image detection unit is used as a reference timer. The time of this reference timer is then used as a reference time for the other units. For synchronization of the times of the timers of the other devices with the reference time, in a first step the reference timer can, by sending running time measuring telegrams (for example via a bus system via which the reference timer is communicatively connected to the other measuring and image detection units) to the timers or the other units, determine the signal running times for these timers and subsequently, in a second step, the time of the other units can, preferably gradually, be adjusted to the reference time of the reference timer with time setting telegrams to the timers of these other devices.

Alternatively the reference timer can also be arranged in the central detection unit. Running time measuring telegrams and time setting telegrams can be sent from the reference timer to the timers of the timers associated with the measuring and image detection units for example via a bus system connecting the central detection unit to the measuring and image detection units. Further details of the synchronization method can be found in German patent application no. 102 41 429.7 belonging to the applicant.

For particularly high-precision temporal synchronization of the image data with the measuring data the image data of each individual image is provided in each instance with a separate time stamp. Alternatively however image data of a predefined number of images may be combined into a group and provided with a common time stamp. In the central detection unit the time stamps of the image data of the individual images can then be obtained from the common time stamp of the image data of a group of images by temporal linearization.

A device according to the invention for analyzing a technical process comprises at least one decentralized measuring unit for generating measuring data of the technical process and at least one decentralized image detection unit for generating image data relating to the mechanical movement sequence of the technical process. The at least one measuring unit and the at least one image detection unit each comprise a time stamping mechanism for time stamping the measuring data or the image data with a time stamp available to all measuring and image detection units. A central detection unit is used for time-synchronous displaying and/or processing of the measuring data and image data using the time stamp. Transmission means are provided for transmitting the measuring data, the image data and the time stamp to the central detection unit.

According to an advantageous embodiment of the device according to the invention a common timer for supplying a time indication for the time stamp is associated with the at least one decentralized measuring unit and the at least one decentralized image detection unit.

Alternatively a separate timer for supplying a time indication for the time stamp can be associated with the at least one decentralized measuring unit and the at least one decentralized image detection unit in each case, the respective timers being synchronized with each other.

BRIEF DESCRIPTION OF THE DRAWINGS

Further advantages of the invention and advantageous developments of the invention according to features of the subclaims will be described in more detail hereinafter with reference to figures. Elements with the same function are provided here with the same reference numerals, in which:

DETAILED DESCRIPTION OF INVENTION

Figure 1:
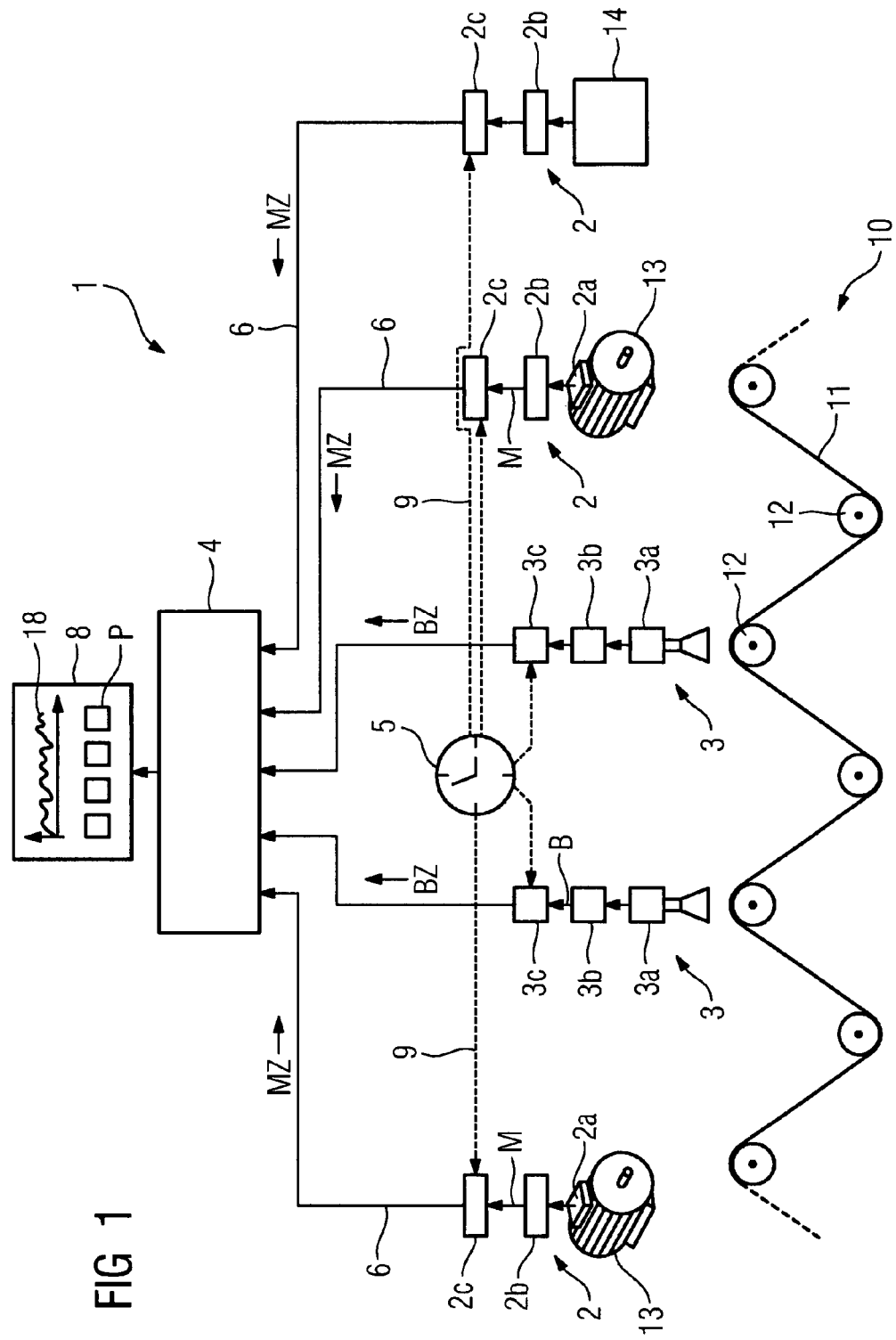
FIG. 1 shows a first, basic embodiment of a device according to the invention for analyzing a technical process.

FIG. 1 shows a device 1 for analyzing a technical process 10. The technical process 10 is a manufacturing process for continuous material 11, such as paper, which, guided by winders 12, runs through a plant (not shown) that is distributed over a wide area for producing the continuous material 11. A large number of driving, energy-supplying and automating components are required for the manufacturing process, of which only two motors 13 and an automation component 14 are shown by way of example in FIG. 1.

Using measuring units 2 measuring signals from the motors 13 and the automating component 14 are detected and transmitted as measuring data to a central detection and evaluation unit 4 via connecting lines 6. The measuring units 2 can, for example, comprise a signal transmitter 2a which passes measuring signals to a device 2b which generates measuring data M from the measuring signals for transmission to the central detection and evaluation unit 4. Each of the measuring units 2 also comprises a time stamping mechanism 2c in which the measuring data M is provided with a time stamp and subsequently transmitted as time-stamped measuring data MZ to the central detection and evaluation unit 4 via a connecting line 6. Of course the time-stamped measuring data MZ can be transmitted via a bus system (see FIG. 2) or wirelessly, for example via a wireless LAN, instead of via discrete connecting lines 6.

For highly accurate visual analysis of the technical process 10 the device 1 also comprises image detection units 3 which are positioned in the immediate vicinity of the continuous material 11 and detect images of the continuous material 11 at a specific point in the process 10 with high frequency. For this purpose the image detection units comprise for example an image pick-up device 3a for converting optical images into electrical signals which are passed to a processing unit 3b in which the electrical signals are converted into image data B. The image detection units 3 each comprise a time stamping mechanism 3c in this connection, in which the image data is provided with a time stamp and is subsequently transmitted as time-stamped image data BZ to the central detection and evaluation unit 4 via a connecting line 6.

A large distance exists between the measuring units 2 and image detection units 3 and the central detection and evaluation unit 4, and between each other, for example in the region of 100 m or more.

The time stamping mechanisms 2c and 3c are connected to a common timer 5 for supplying a time indication for a time stamp for time stamping the measuring data M and the image data B in the time stamping mechanisms 2c and 3c. There is therefore a time stamp for time stamping available in all time stamping mechanisms 2c and 3c. The timer 5 can be connected in this case wirelessly and in a wired manner to the measuring units 2 or image detection units 3 via the connections 9, shown in broken lines. The timer 5 is formed for example by signals from the GPS system or a radio clock.

The time-stamped measuring data MZ or image data BZ is transmitted from the measuring units 2 or image detection units 3 to the central detection and evaluation unit 4 in which it is stored. Here it can subsequently be displayed, i.e. offline, in a time-synchronous manner on a display unit 8. By way of example FIG. 1 shows in the display unit 8 a characteristic 18 over time of a measuring signal obtained from measuring data M via images P which were obtained from image data B recorded at the same times.

Running times of the measuring and image data on the connecting lines 6 to the central detection and evaluation unit 4 are insignificant owing to time stamping in a decentralized manner in the measuring units 2 and image detection units 3, and the image and measuring data can be temporally synchronized in the central detection and evaluation unit 4 with the utmost accuracy.

Figure 2:
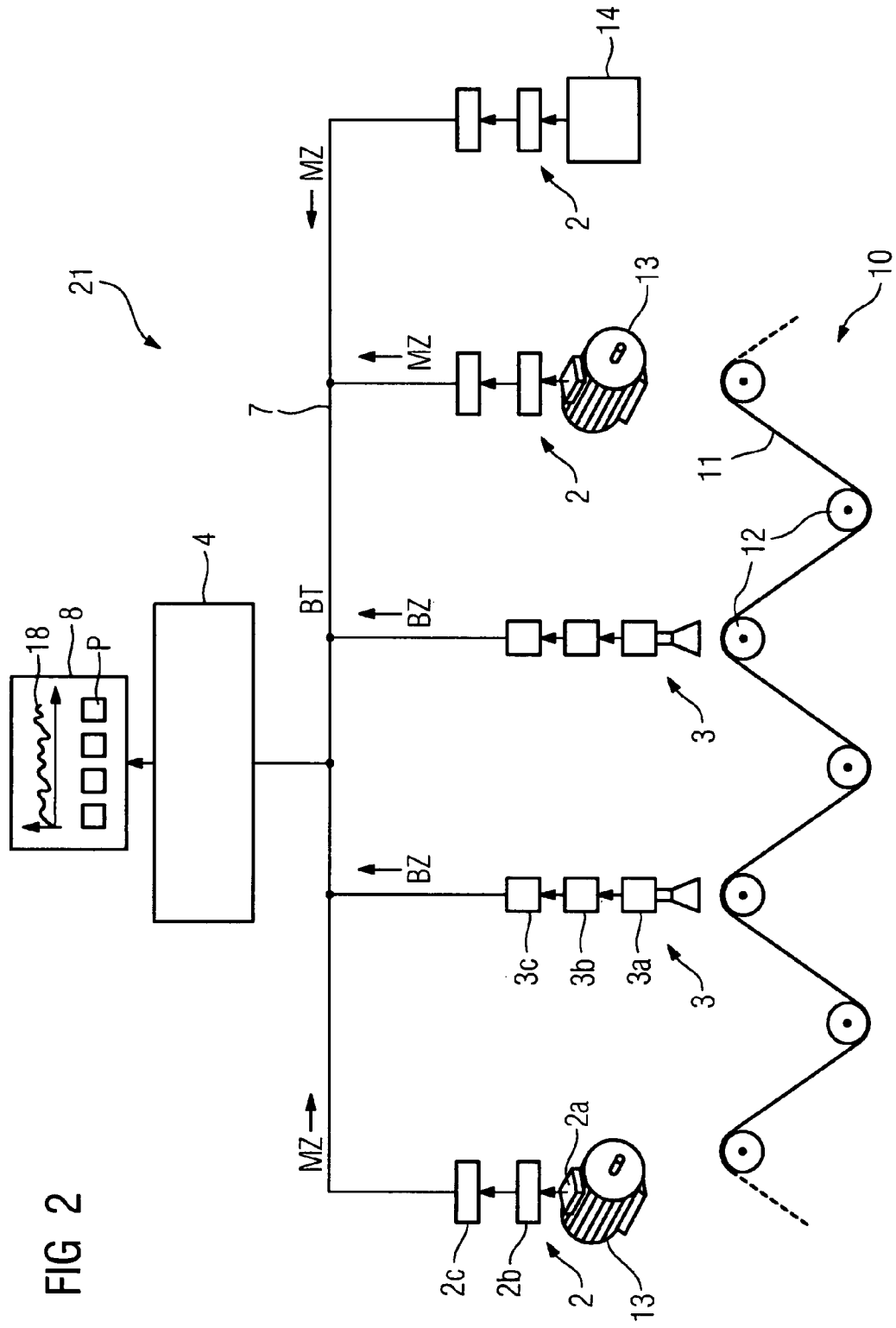
FIG. 2 shows a second particularly advantageous embodiment of a device according to the invention for analyzing a technical process.

In the case of the device 21, shown in FIG. 2, for analyzing a technical process 10, the common timer is a bus system 7 via which the measuring device 2, the image detection devices 3 and the central detection and evaluation unit 4 are connected to each other and via which the time-stamped measuring data MZ and image data BZ are also transmitted. The bus clock VT is preferably used as a time indication for the time stamp in this connection. The bus system is in particular a standardized bus system, in particular a bus system designated IEEE 1394. This bus system is also known by the name of "Firewire". Particularly high-precision, relative time stamping is possible by way of the bus clock made available by this bus system.

Figure 3:
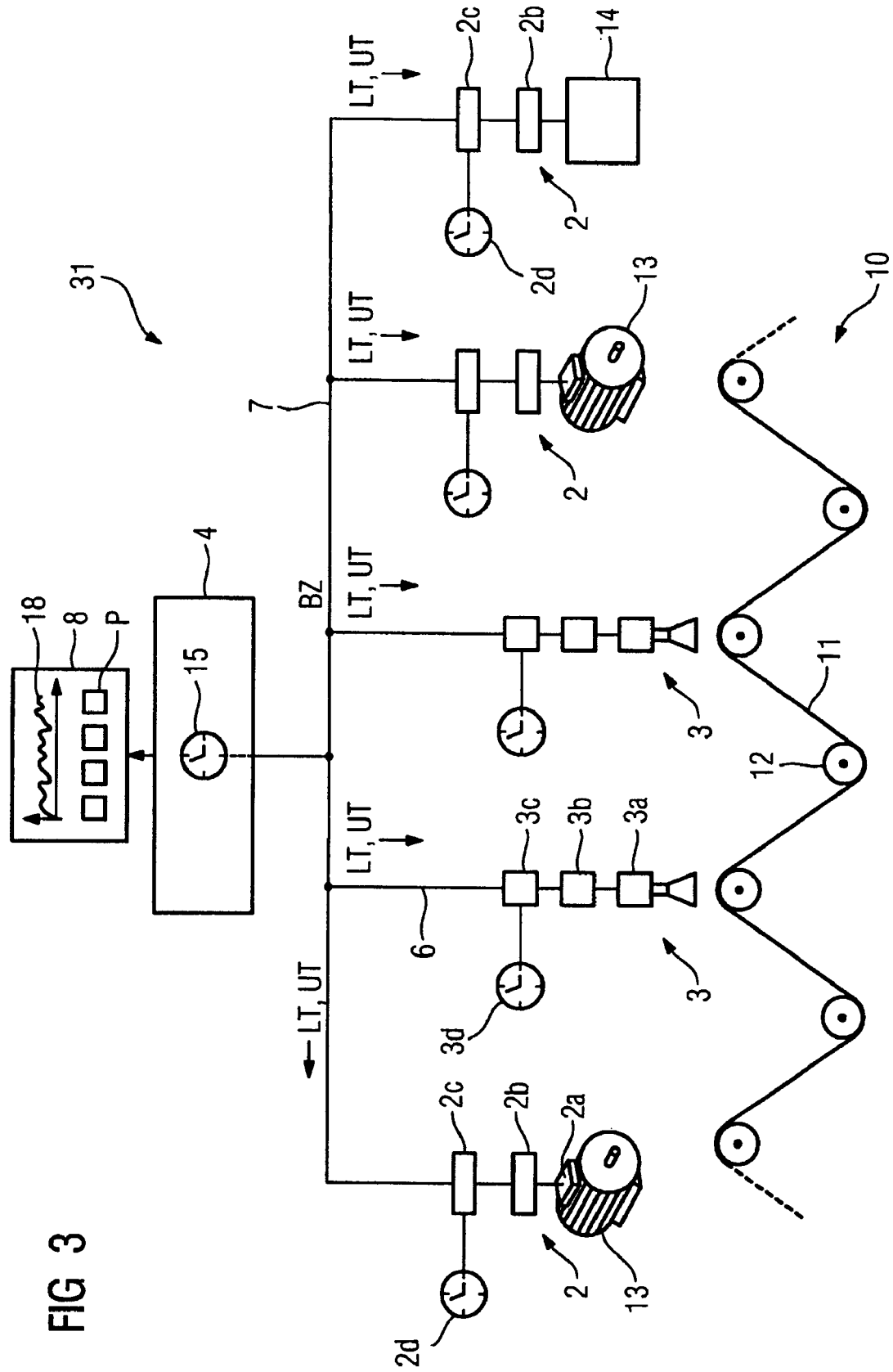
FIG. 3 shows a third embodiment of a device according to the invention for analyzing a technical process.

The device 31 shown in FIG. 3 for analyzing a technical process 10 differs from the devices shown in FIGS. 1 and 2 in that, instead of a common timer, a separate timer 2d or 3d is associated with the measuring and image detection devices 2 and 3 in each case. In the embodiment the timers 2d, 3d are shown as separate components connected to the time stamping mechanisms 2c and 3c but they can also be integrated in the respective time stamping devices 2c and 3c.

All timers 2d, 3d are synchronized with each other in this connection. Temporal synchronization takes place by way of the measuring bus system 7, via which the measuring and image detection units 2, 3 are connected to each other and to the central detection and evaluation unit 4. For this purpose the central detection and evaluation unit 4 comprises a reference timer 15, the time of which is used as a reference time for the timers 2d and 3d of the measuring and image detection units 2 and 3.

For synchronization of the times of the timers 2d and 3d of the measuring and image detection units 2 and 3 with the reference time, in a first step the reference timer 15 can, by sending running time measuring telegrams LT to the timers 2d, 3d, determine the signal running times for these timers and subsequently, in a second step, the time of the timers 2d, 3d can, preferably gradually, be adjusted to the reference time of the reference timer 15 with time setting telegrams UT to these timers 2d, 3d.

Figure 4:
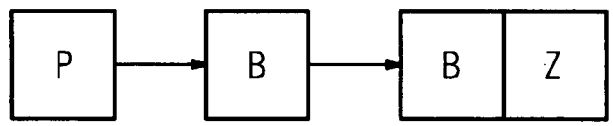
FIG. 4 shows a basic diagram of time stamping of the image data of each individual image.

Time stamping in the measuring and image detection units 2 and 3 of FIGS. 1 to 3 shall be described in more detail with reference to FIGS. 4 to 6. According to FIG. 4 digital image data B is generated in an image detection unit 3 from an image P, this is provided with a time stamp Z and transmitted to the central detection and evaluation unit 4. For particularly accurate time synchronization with measuring data M or other image data B in the central detection and evaluation unit 4, the image data B of each individual image P is provided with a separate time stamp Z in each case.

Figure 5:
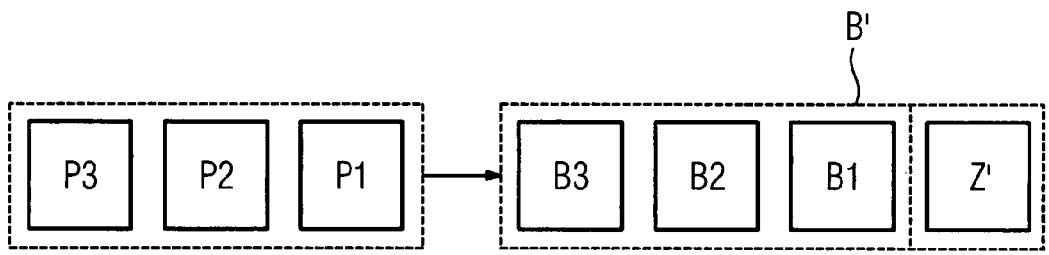
FIG. 5 shows a basic diagram of time stamping of the image data of a group of images.
Figure 6:
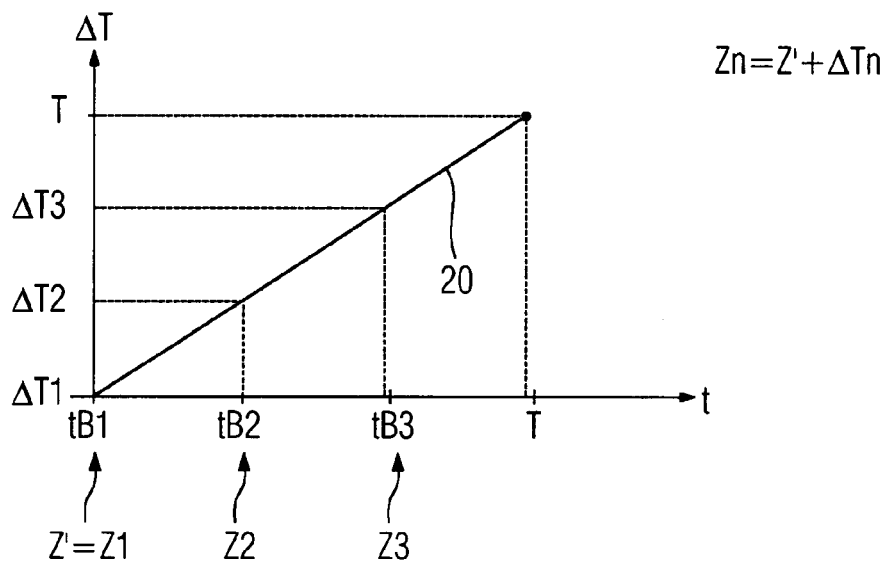
FIG. 6 shows obtaining of the individual time stamps of the image data of a group of images using a common time stamp by temporal linearization.

With low accuracy requirements of the time synchronization, according to FIG. 5 it is sufficient if image data B1, B2, B3 of a predefined number of images P1, P2, P3 is combined to form a group B' in each case and is provided with a common time stamp Z'.

Even with this type of combining to form a group it is possible to achieve the accuracy of individual time stamping in the central detection and evaluation unit 4. For this purpose the time stamps Z1, Z2, Z3 of the image data B1, B2, B3 of the individual images P1, P2, P3 are regained in the central detection and evaluation unit 4 from the common time stamp Z' of the image data of the group B' of image data B1, B2, B3 by temporal linearization. As FIG. 6 shows, the following applies for the time stamp Zn of the image data Bn: $Zn=Z'+\Delta Tn$. Here Z' is the time stamp of the earliest data, i.e. the data of B1, and $\Delta Tn$ is an offset which is determined in a substantially self-explanatory manner from the characteristic 20 in FIG. 6. In the illustrated graph the offset $\Delta T$ for the image data B1, B2 and B3 is shown on the ordinate over the points in time t of generation of the image data B1, B2, B3. Time stamping takes place in this connection at intervals of T respectively, wherein image data B1, B2, B3 of three images P1, P2, P3 is generated between successive time stampings Z' and is transmitted to the central detection and evaluation unit 4 in each case. For the image data B1, generated at the point in time of stamping Z', an offset of $\Delta T1=0$ thus results, for the image data B2, generated at point in time $tB2=T/3$ an offset of $\Delta T2=T/3$ and for the image data B3, generated at point in time $tB3=2T/3$, an offset of $\Delta T3=2T/3$.

The invention claimed is:

1. A method for analyzing a technical process of an industrial process plant, comprising:
   measuring data of the technical process generated by a decentralized measuring unit;
   generating image data relating to a mechanical movement sequence of the technical process by a decentralized image detection unit, the image data being based upon optical images converted into electrical signals;
   providing the measuring data in the decentralized measuring unit and the image data in the image detection unit with a time stamp that is available to all units;
   transmitting the measure data and the image data to a central detection unit; and processing or displaying the transmitted measure and image data in a time synchronous manner in the central detection unit using the time stamp.

2. The method as claimed in claim 1, wherein the transmitted measure data and image data are processed and displayed.

3. The method as claimed in claim 1, wherein a common timer for supplying a time indication for the time stamp is associated with the decentralized measuring unit and the decentralized image detection unit.

4. The method as claimed in claim 3, wherein the common timer is a bus system that connects the measuring unit and the image detection unit to each other.

5. The method as claimed in claim 4, wherein a bus clock of the bus system is used as a time indication for the time stamp.

6. The method as claimed in claim 1, wherein a separate timer for supplying a time indication for the time stamp is associated with the decentralized measuring unit and the decentralized image detection unit in each case, the respective timers being synchronized with each other.

7. The method as claimed in claim 6, wherein temporal synchronization takes place by a reference timer.

8. The method as claimed in claim 7, wherein the reference timer is arranged in the central detection unit.

9. The method as claimed in claim 7, wherein one of a plurality of timers of the decentralized measuring unit or the decentralized image detection unit is the reference timer.

10. The method as claimed claim 9, wherein the image data of each individual image is provided with a separate time stamp in each case.

11. The method as claimed in claim 10, wherein the image data of a predefined number of images is combined into a group in each instance and provided with a common time stamp.

12. The method as claimed in claim 11, wherein in the central detection unit the time stamps of the image data of the individual images are obtained from the common time stamp of the image data of a group of images by temporal linearization.

13. A device for analyzing a technical process, comprising:
a decentralized measuring unit for generating measuring data of the technical process;
a decentralized image detection unit for generating image data relating to the mechanical movement sequence of the technical process, the image data being based upon optical images converted into electrical signals,
wherein the measuring unit and the image detection unit each comprise a time stamping unit for time stamping the measuring data and/or the image data with a time stamp that is available to all measuring and image detection units;
a central detection unit for time-synchronous displaying and/or processing of the measuring data and image data using the time stamp; and
a transmission device for transmitting the measuring data, the image data and the time stamp to the central detection unit.

14. The device as claimed in claim 13, wherein a common timer for supplying a time indication for the time stamp is associated with the decentralized measuring unit and the decentralized image detection unit.

15. The device as claimed in claim 14, wherein the common timer is a bus system via which the measuring unit and the image detection unit are connected to each other.

16. The device as claimed in claim 15, wherein the bus clock provides the time indication for the time stamp.

17. The device as claimed in claim 13, wherein a separate timer for supplying the time indication for the time stamp is associated with the decentralized measuring unit and the decentralized image detection unit in each instance, where the timers are synchronized temporally with each other.

18. The device as claimed in claim 17, wherein the temporal synchronization takes place via a reference timer.

19. The device as claimed in claim 18, wherein the reference timer is arranged in the central detection unit.

20. The device as claimed in claim 18, wherein the reference timer is one of a plurality of timers of the decentralized measuring unit or the decentralized image detection unit.

* * * * *